Dec. 13, 1966 D. J. ABEL 3,291,270
LATCH OPERATED GEAR CLUTCH
Filed July 20, 1964 2 Sheets-Sheet 1

INVENTOR.
BY Donald J. Abel

United States Patent Office 3,291,270
Patented Dec. 13, 1966

3,291,270
LATCH OPERATED GEAR CLUTCH
Donald J. Abel, 712 Summit Ave., Franklin Lakes, N.J.
Filed July 20, 1964, Ser. No. 383,660
4 Claims. (Cl. 192—30)

This invention relates to clutch devices and more particularly to a device that controls output motion from an input motion.

It is an object of the instant invention to provide a clutching device that will not depend on a locking angle or friction surface to establish drive contact.

Another object is to provide a device for clutching that can be capable of a minimum of engagement time following the actuating signal.

A further object is to provide a clutch that does not depend on a spring force for its direct locking action.

Another object is to provide a clutch device whose movement will depend on the position of an external device.

Another object of the instant invention is to provide a clutching action that results from rolling contact and therefore produce a minimum of wear in operation.

Another object is to provide a clutching action which locks by reverse rotation of the components rather than inertia.

An additional object is to provide a clutch device of good precision without unusual or ultra precise machining.

In the attainment of aforesaid objectives, subject clutch device is made in two embodiments. In each embodiment the locking and unlocking functions are performed with a cogwheel assembly. The embodiments differ in respect to the items which they drive and the method of containing the cogwheel assembly.

A fuller understanding of the invention may be had by referring to the following descriptions and claims, taken in conjunction with the accompanying drawings in which:

Figure 1:
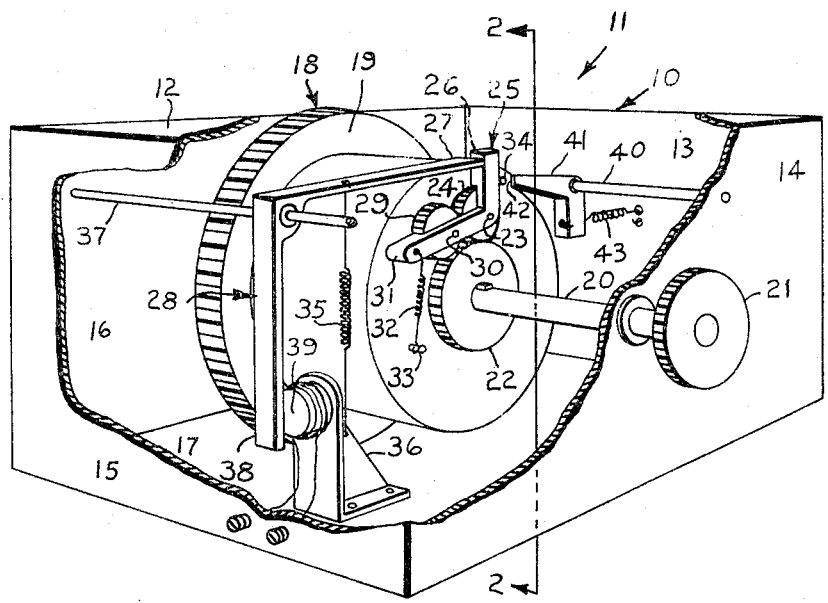
FIGURE 1 is a perspective view of one embodiment of the invention with the casing cut away for clarity of viewing.
Figure 2:
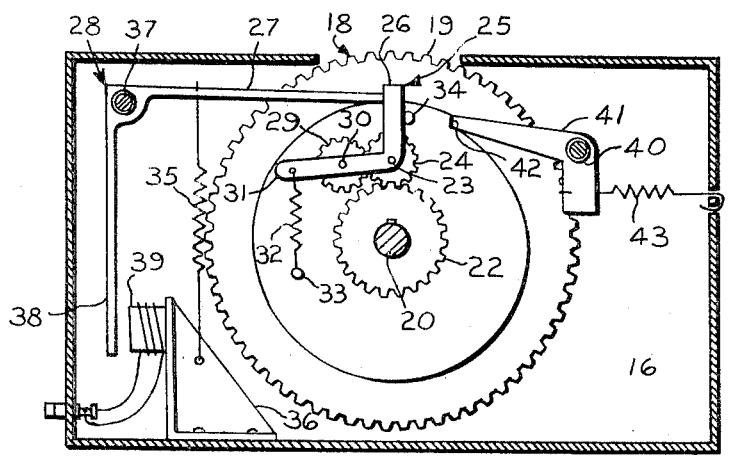
FIGURE 2 is a cross-sectional view of FIGURE 1 showing the clutch mechanism. The cross-sectional view is taken on line 2—2 of FIGURE 1.

With reference to the drawing the invention is illustrated as being incorporated in a casing 10 of the clutch assembly 11 as shown in FIGURE 1. The casing 10 consists of six sides 12, 13, 14, 15, 16, and 17 joined together at their edges by any known means. Side 12 of casing 10 is cut away above gear shaft 18 to allow external transmission of the output motion by engagement with output gear 19. Rotating shaft 20 is driven by external gear 21. Rotating with shaft 20 is sun gear 22 attached by any known means that will permit removal along shaft 20. Gear shaft 18 is not secured to shaft 20 and therefore can be held stationary while shaft 20 rotates. Gear shaft 18 is held axially next to sun gear 22 by a retaining ring in shaft 20. Engaged with sun gear 22 and mounted to gear shaft 18 on stationary pivot 23 is planetary gear 24. Planetary gear 24 is fixed to stationary pivot 23 but is free to rotate on it. Also fixed to stationary pivot 23 but free to rotate on it is arm assembly 25. End 26 of arm assembly 25 extends beyond the outside diameter of gear shaft 18 as shown in FIGURE 2 to engage stop lever 27 of stop assembly 28. At an engaged center distance from planetary gear 24 and rotating with said gear is locking gear 29 mounted on shaft 30 which is positioned in arm assembly 25. At outer end 31 of arm assembly 25 is an opening into which spring 32 is contained. At its other end spring 32 is mounted to spring post 33. Spring post 33 is fixed to gear shaft 18 and puts spring 32 under tension directing arm assembly 25 downward when stop lever 27 is removed. Stop pin 34 fixed to gear shaft 18 controls the amount of backward movement of arm assembly 25 when it engages stop lever 27. As shown in FIGURE 2 sun gear 22 is rotating counter clockwise, planet gear 24 clockwise, and locking gear 29 counter clockwise. For rotational engagement all gears are the same pitch. Stop lever 27 rides partially on gear shaft 18 and is held against it by spring 35 which engages an opening in stop lever 27 and another opening in bracket 36. Bracket 36 is attached by any known means to side 17 of casing 10. Stop assembly 28 is mounted axially on shaft 37 by any known means that will permit removal. Shaft 37 is held by sides 16 and 14 of casing 10. End 38 of stop assembly 28 is capable of magnetic attraction and is forcefully positioned inwardly when electro magnet 39 mounted in bracket 36 is energized from an external source. As end 38 is attracted inwardly, stop assembly 28 rotates counter clockwise releasing arm assembly 25. When the external power is removed; spring 35 returns stop lever 27 to the surface of gear shaft 18 where it will contact arm assembly 25 as it rotates. Rotatably fixed on shaft 40 which is held in sides 14 and 16 of casing 10, and axially fixed on said shaft by any known means that will permit removal is backstop lever 41. Backstop lever 41 is held against gear shaft 18 by spring 43 whose ends are mounted in an opening in backstop lever 41 and openings in side 13 of casing 10 as shown in FIGURE 2. A grooved opening 42 in gear shaft 18 is for the location of backstop lever 41 when arm assembly 25 is in its locked position to prevent backward motion of gear shaft 18.

Figure 3:
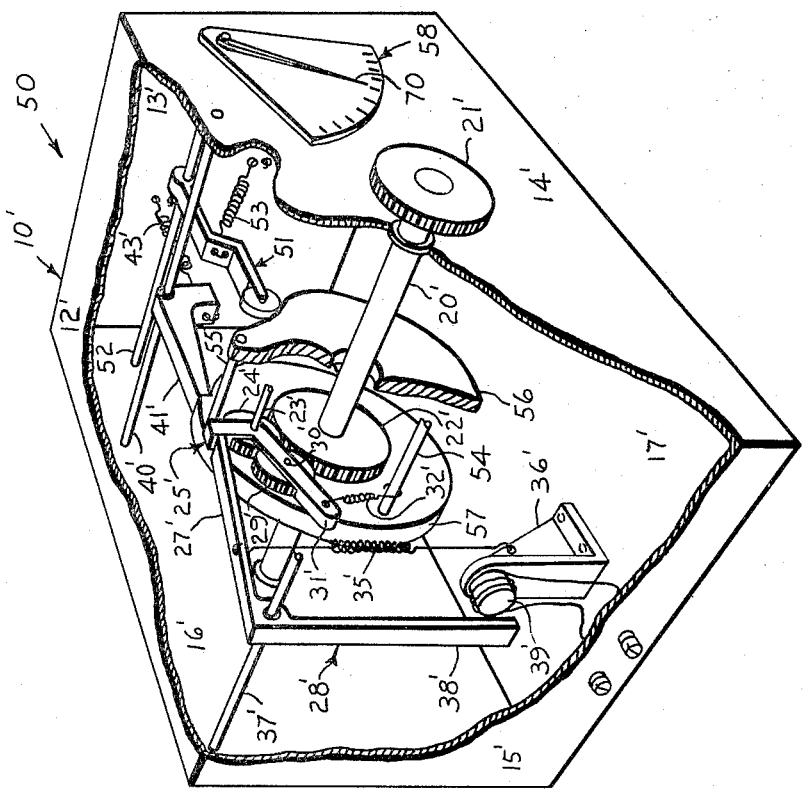
FIGURE 3 is a perspective view of a second embodiment of the invention showing a cam and follower with the casing cut away for clarity of viewing.

A second embodiment 50 of the invention is shown in FIGURE 3 with a similar construction as the first embodiment indicated by the prime numbers. The second embodiment differs from the first as follows: Sun gear 22' is mounted to shaft 20' in the same manner as the first embodiment but is contained between an end piece 57 and a cam 56 by any known means that will permit removal. End piece 57 and cam 56 are free to slip on shaft 20'. Cam 56 is held in spaced parallel arrangement to end piece 57 by spacer posts 55 and 54 and also stationary pivot 23'. Arm assembly 25', planetary gear 24', and locking gear 29' are assembled in a similar manner as in the first embodiment relative to sun gear 22'. Spring 32' is mounted between the outer end of arm assembly 25' and spacer post 54. Spacer post 55 limits the backward motion of arm assembly 25' when it is engaged with stop lever 27'. Stop assembly 28' and its coacting parts are the same as the first embodiment. Stop lever 27' rides on end piece 57 after actuation. Backstop lever 41' and its coacting parts are the same as the first embodiment with its front end as shown in FIGURE 3 engaging a grooved opening in end piece 57 at the stopped position. Follower assembly 51 riding on cam 56 and fixed to shaft 52 is held against said cam by spring 53 mounted between said follower assembly 51 and side 13' of casing 10'. Shaft 52 mounted in bearings in sides 16' and 14' has a pointer 70 fixed to its outer end that indicates its position on dial 58 attached to side 14'.

In operation the rotating shaft can be moving in various modes and the sun gear with it. The stop lever interposed in front of an arm assembly will prevent the remaining assembly from moving with the rotating shaft although the planet gear and locking gear will be engaged and continuously rotating. The sun gear will rotate counter clockwise; the planet gear will rotate clockwise and the locking gear counter clockwise because of their position in the train when viewed from the right side of the assembly. It is noted that at the surfaces closest to contact, the locking gear and the sun gear are moving in opposite directions. When a signal is received by the electro magnet, the stop lever spring is overcome; rotating the stop lever away from the arm assebly. This enables the arm assembly spring to move the arm assembly downward and the locking gear into mesh with the sun gear. All gears being of the same pitch and engaged enables this motion. The opposite rotation at engagement of the locking and sun gears will increase the locking action. After this action the arm assembly and whatever is attached to it will rotate with the sun gear and shaft. Upon removal of the external signal to the electro magnet the stop lever directed downward by a spring rides on the assembly until it again contacts the arm assembly rotating the locking gear engagement face momentarily in the same direction as the sun gear as it moves away to disengage the locked position and stop the outer assembly. To prevent reverse rotation or slippage of the assembly a backstop lever is employed to engage the assembly in the stop position.

Although I have described my invention with a certain degree of particularity, it is understood that the present disclosure has been made only by way of example and that the arm assembly could have many extending sections to contact the stop lever in other positions besides 360 degrees, and any part capable of being meshed may be used other than gears with additional changes in the details of construction and the combination and arrangement of parts may be resorted to without departing from the spirit and the scope of the invention as hereinafter claimed.

I claim as my invention:

1. A clutch device requiring external support positioned along and in combination with a rotatable shaft comprising, a sun cogwheel rotating with said shaft, a rotary output member freely mounted on the shaft and aligned with said sun cogwheel, a planet cogwheel engaged with the sun cogwheel and pivotly mounted to said rotary output member, an arm attached rotatable at the planet cogwheel's pivot, a locking cogwheel mounted rotatable to said arm and engaged with said planet cogwheel, a spring with one end attached to said arm and a second end attached to said rotary output member at a spring post to engage said locking cogwheel with said sun cogwheel, a stop lever mounted rotatable in the support with one end in contact with the rotary output member and the arm to disengage the locking cogwheel from the sun cogwheel, means to position said stop lever in front of and away from said arm, a stop pin fixed in said rotary output member to limit the backward motion of said arm, a backstop lever mounted rotatable in the support and forcefully positioned against said rotary output member to engage an opening for prevention of backward rotation.

2. A clutch device requiring external support positioned along and in combination with a rotatable shaft comprising, a sun gear rotating with said shaft, a rotary output member freely mounted on the shaft and aligned with said sun gear, a planet gear engaged with the sun gear and pivotly mounted to said rotary output member, an arm attached rotatable at the planet gear pivot, a locking gear mounted rotatable on said arm and engaged with said planet gear, a spring with one end attached to said arm and a second end attached to said rotary output member at a spring post to engage said locking gear with said sun gear, a stop lever mounted rotatable in the support with one end in contact with the rotary output member and the arm to disengage the locking gear from the sun gear, electro magnetic means to position said stop lever in front of and away from said arm, a stop pin fixed in said rotary output member to limit the backward motion of said arm, a backstop lever mounted rotatable in the support and forcefully positioned against said rotary output member to engage an opening for prevention of backward rotation.

3. A clutch device requiring external support positioned along and in combination with a rotatable shaft comprising, a sun cogwheel rotating with said shaft, a cam freely mounted on the shaft and aligned with said sun cogwheel, an end piece in fixed space parallel arrangement with the cam about the sun cogwheel, a planet cogwheel engaged with the sun cogwheel and attached rotatable on a pivot that connects said end piece with said cam, an arm attached rotatable at the planet cogwheel's pivot, a locking cogwheel mounted rotatable on said arm and engaged with said planet cogwheel, a spring with one end attached to said arm and a second end attached to a first spacer post that connects said end piece to said cam to engage said locking cogwheel with said sun cogwheel, a stop lever mounted rotatable in the support with one end in contact with the end piece and the arm to disengage the locking cogwheel from the sun cogwheel, means to position said stop lever in front of and away from said arm, a second spacer post fixed to said end piece and cam to limit the backward motion of said arm, a backstop lever mounted rotatable in the support and forcefully positioned against said end piece to engage an opening for the prevention of backward rotation, a cam follower mounted rotatable in the support that contacts said cam.

4. A clutch device requiring external support positioned along and in combination with a rotatable shaft comprising, a sun gear rotating with said shaft, a cam freely mounted on the shaft and aligned with said sun gear, an end piece in fixed space parallel arrangement with the cam about the sun gear, a planet gear engaged with the sun gear and attached rotatable on a pivot that connects said end piece with said cam, an arm attached rotatable at the planet gear's pivot, a locking gear mounted rotatable on said arm and engaged with said planet gear, a spring with one end attached to said arm and a second end attached to a first spacer post that connects said end piece to said cam to engage said locking gear with said sun gear, a stop lever mounted rotatable in the support with one end in contact with the end piece and the arm to disengage the locking gear from the sun gear, electro magnetic means to position said stop lever in front of and away from said arm, a second spacer post fixed to said end piece and cam to limit the backward motion of said arm, a backstop lever mounted rotatable in the support and forcefully positioned against said end pieces to engage an opening for prevention of backward rotation, a cam follower mounted rotatable in the support that contacts said cam and transmits motion external to the support.

References Cited by the Examiner

UNITED STATES PATENTS

| 3,101,827 | 8/1963 | Showalter | 192—30 X |
| 3,148,755 | 9/1964 | Pisano | 192—71 |

FOREIGN PATENTS

| 308,495 | 3/1929 | Great Britain. |

OTHER REFERENCES

Schopp, R. E.; IBM Technical Disclosure Bulletin, vol. I, No. 4, December 1958, p. 12.

DAVID J. WILLIAMOWSKY, *Primary Examiner.*

B. W. WYCHE, *Assistant Examiner.*